United States Patent
Kim et al.

(10) Patent No.: US 10,005,942 B2
(45) Date of Patent: Jun. 26, 2018

(54) THERMAL INSULATION COATING COMPOSITION AND THERMAL INSULATION COATING LAYER

(71) Applicant: HYUNDAI MOTOR COMPANY, Seoul (KR)

(72) Inventors: Bokyung Kim, Yongin-si (KR); In Woong Lyo, Suwon-si (KR); Woong Pyo Hong, Seoul (KR); Hong Kil Baek, Seoul (KR); Kwang Hoon Choi, Yongin-si (KR); Seung Woo Lee, Seoul (KR); Jiyoun Seo, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 258 days.

(21) Appl. No.: 14/946,593

(22) Filed: Nov. 19, 2015

(65) Prior Publication Data

US 2017/0029681 A1 Feb. 2, 2017

(30) Foreign Application Priority Data

Jul. 30, 2015 (KR) ................. 10-2015-0108329

(51) Int. Cl.
| | | |
|---|---|---|
| *C09K 5/10* | (2006.01) | |
| *C09D 7/65* | (2018.01) | |
| *F02B 77/11* | (2006.01) | |
| *C09D 7/20* | (2018.01) | |
| *C09D 5/00* | (2006.01) | |
| *C09D 1/04* | (2006.01) | |
| *C08L 71/02* | (2006.01) | |
| *C09D 171/02* | (2006.01) | |
| *C09D 7/61* | (2018.01) | |
| *C08K 7/22* | (2006.01) | |
| *C08K 7/26* | (2006.01) | |

(52) U.S. Cl.
CPC ............... *C09K 5/10* (2013.01); *C08L 71/02* (2013.01); *C09D 1/04* (2013.01); *C09D 5/00* (2013.01); *C09D 7/20* (2018.01); *C09D 7/61* (2018.01); *C09D 7/65* (2018.01); *C09D 171/02* (2013.01); *F02B 77/11* (2013.01); *C08G 2650/58* (2013.01); *C08K 7/22* (2013.01); *C08K 7/26* (2013.01)

(58) Field of Classification Search
CPC ... F02B 77/02; F02B 77/11; F02F 3/10; F02F 3/105; F02F 3/12; F02F 3/14; C09D 171/02; C09D 7/125; C09D 5/00; C09D 5/028; C09D 7/1216; C09D 7/1283; C09D 127/16; C08K 3/36; C08K 7/22; C08K 7/26; C09K 5/10; C08L 71/02; B32B 2266/126

See application file for complete search history.

(56) References Cited

U.S. PATENT DOCUMENTS

| | | | |
|---|---|---|---|
| RE29,783 E * | 9/1978 | Smith | C02F 1/66 106/705 |
| 4,852,542 A * | 8/1989 | Kamo | F02B 77/02 123/188.3 |
| 2005/0148692 A1* | 7/2005 | Burchill, Jr. | C09D 5/028 523/218 |
| 2007/0027232 A1 | 2/2007 | Walsh et al. | |
| 2008/0287561 A1* | 11/2008 | Menashi | C08J 9/0066 521/142 |
| 2012/0097907 A1* | 4/2012 | Bauer | C04B 14/064 252/602 |
| 2012/0142240 A1 | 6/2012 | Eling et al. | |
| 2013/0255651 A1* | 10/2013 | Nomura | F02B 23/00 123/668 |
| 2013/0344279 A1 | 12/2013 | Doshi et al. | |
| 2014/0057083 A1 | 2/2014 | Imae et al. | |
| 2014/0361209 A1 | 12/2014 | Yrieix et al. | |

FOREIGN PATENT DOCUMENTS

| | | | |
|---|---|---|---|
| CN | 104609825 A | 5/2015 | |
| KR | 10-2008-0101264 A | 11/2008 | |
| KR | 10-2012-0023707 A | 3/2012 | |
| KR | 10-1142673 B1 | 5/2012 | |
| KR | 10-2013-0039028 A | 4/2013 | |
| KR | 10-2015-0080239 A | 7/2015 | |
| WO | WO-2007047970 A2 * | 4/2007 | C08J 9/0066 |

OTHER PUBLICATIONS

Alexandridis et al. "Polyethylene oxide)-poly(propylene oxide)-poly(ethylene oxide) block copolymer surfactants in aqueous solutions and at interfaces: thermodynamics, structure, dynamics, and modeling", Colloids Surfaces A: Physicochem. Eng. Aspects 96 pp. 1-46, Mar. 10, 1995. (Year: 1995).*

Wiehn, et al., "Adsorption of Short-Chain Alcohols by Hydrophobic Silica Aerogels", Industrial & Engineering Chemistry Research, 52, 18379-18385, Dec. 2013. (Year: 2013).*

European Search Report dated Nov. 15, 2016, issued in European Application No. 15196490.5.

* cited by examiner

*Primary Examiner* — Christopher M Rodd
(74) *Attorney, Agent, or Firm* — McDermott Will & Emery LLP

(57) ABSTRACT

A thermal insulation coating composition includes a polymer having a C1-5 alkylene oxide repeat unit, aerogel and a water soluble binder.

15 Claims, No Drawings

THERMAL INSULATION COATING COMPOSITION AND THERMAL INSULATION COATING LAYER

CROSS-REFERENCE TO RELATED APPLICATION

This application claims the benefit of priority to Korean Patent Application No. 10-2015-0108329 filed in the Korean Intellectual Property Office on Jul. 30, 2015, the entire contents of which are incorporated herein by reference.

TECHNICAL FIELD OF THE DISCLOSURE

The present disclosure relates to a thermal insulation coating composition and a thermal insulation coating layer.

More specifically, the present disclosure relates to a thermal insulation coating composition that has low thermal conductivity and low volumetric heat capacity, yet may have excellent mechanical properties and heat resistance, have a uniform composition over the whole area, and when applied to an internal combustion engine, may reduce thermal energy emitted outside to improve internal combustion engine efficiency and automobile fuel efficiency, and further relates to a thermal insulation coating layer formed therefrom.

BACKGROUND OF THE DISCLOSURE

Commonly, an internal combustion engine of an automobile is known to have thermal efficiency of about 15% to 35%, and even at the maximum efficiency of the internal combustion engine, about 60% of the total heat energy is consumed due to heat energy released outside through the walls of the internal combustion engine, associated components and exhaust gasses.

As such, since the efficiency of an internal combustion engine may be increased if the amount of heat energy released outside through the wall of an internal combustion engine is reduced, methods of installing thermal insulation material outside of an internal combustion engine, modifying a part of the structure or material of an internal combustion engine, or developing a cooling system for an internal combustion engine have been employed.

Particularly, if a release of heat generated in an internal combustion engine outside through the wall of the internal combustion engine is minimized, the efficiency of an internal combustion engine and the fuel efficiency of an automobile can be improved. However, studies on thermal insulation material or thermal insulation structures that can be maintained for a long time inside of an internal combustion engine to which high temperature and high pressure conditions are repeatedly applied are insufficient.

Recently, based on the fact that aerogel, a nanosize material, having high specific surface material with high porosity, is effective for improving light weight and thermal insulation properties, various studies have been conducted on mixing of binder compounds and aerogels in order to use aerogel for thermal insulation material inside of an internal combustion engine.

However, due to a failure of appropriate mixing of aerogel and binder compounds or of a penetration of binder compounds into the aerogel according to the surface property of aerogel, an optimum level of thermal insulation property was not reached.

In order to solve these problems, there is a demand for the development of a novel thermal insulation coating composition that can control the surface property of aerogel, and appropriately mix aerogel and binder compounds to maximize thermal insulation property.

SUMMARY OF THE DISCLOSURE

It is an object of the disclosure to provide a thermal insulation coating composition that has low thermal conductivity and low volumetric heat capacity, yet may have excellent mechanical properties and heat resistance, have a uniform composition over the whole area, and when applied to an internal combustion engine, may reduce thermal energy released outside to improve internal combustion engine efficiency and automobile fuel efficiency, and to provide a thermal insulation coating layer prepared using the same.

The present disclosure provides a thermal insulation coating composition comprising a polymer comprising a C1-5 alkylene oxide repeat unit, aerogel, and a water soluble binder.

The present disclosure also provides a thermal insulation coating layer comprising a water soluble binder, and polymer comprising a C1-5 alkylene oxide repeat unit and aerogel dispersed in the water soluble binder, wherein the thermal insulation coating layer has a thermal conductivity of 0.40 W/m K or less.

DETAILED DESCRIPTION

Hereinafter, a thermal insulation coating composition and a thermal insulation coating layer according to specific embodiments of the disclosure will be explained in detail.

According to one embodiment of the disclosure, provided is a thermal insulation coating composition comprising a polymer comprising a C1-5 alkylene oxide repeat unit; aerogel; and a water soluble binder.

If a polymer comprising a C1-5 alkylene oxide repeat unit is mixed with aerogel, a part for adjusting length included in the polymer is adsorbed onto the surface of the aerogel, and thus, the outer surface of the aerogel is modified with the hydrophilic C1-5 alkylene oxide repeat unit.

Thus, it was confirmed through experiments that compatibility between the aerogel and the water soluble binder may increase, a uniform composition may be exhibited over the whole area of the thermal insulation coating composition, and the binder may be prevented from being penetrated into the nanopores of the aerogel, thus realizing high thermal insulation performance through low thermal conductivity and volumetric heat capacity.

The thermal insulation coating composition may provide thermal insulation material or a thermal insulation structure that can be maintained for a long time inside an internal combustion engine to which high temperature and high pressure conditions are repeatedly applied, and specifically, the thermal insulation coating composition of the one embodiment may be used for coating of the inner side of an internal combustion engine or component of an internal combustion engine.

Specifically, the thermal insulation coating may comprise a polymer comprising a C1-5 alkylene oxide repeat unit.

The C1-5 alkylene oxide repeat unit may render the polymer amphiphilic, while exhibiting relatively hydrophilic properties.

Since the alkylene oxide repeat unit exhibits an electrically neutral property without having positive electric charge or negative electric charge, it is not dissociated into ions, and thus, the aerogel may be uniformly dispersed.

And, since the alkylene oxide repeat unit may exhibit hydrophilicity, it may render the surface of the aerogel hydrophilic to improve compatibility with the water soluble binder, thus rendering the thermal insulation coating layer uniform, thereby securing a high thermal insulation property.

Specifically, the C1-5 alkylene oxide repeat unit may include a repeat unit represented by the following Chemical Formula 1.

[Chemical Formula 1]

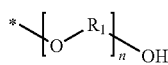

In the Chemical Formula 1, $R_1$ is a C1-5 linear or branched alkylene group, and n is an integer of 1 or more.

Preferable examples of the C1-5 linear or branched alkylene group may include a C1-2 alkylene group, for example, a methylene group or an ethylene group.

The "*" denotes a direct bond.

The polymer may comprise the C1-5 alkylene oxide repeat unit in a content of 2 wt % to 50 wt %, or 5 wt % to 40 wt %, or 10 wt % to 30 wt %.

The polymer may further comprise at least one part for adjusting length selected from the group consisting of a C1-50 linear or branched alkyl group, a C1-50 acyl group, a C1-50 ester group, a C6-50 aryl group, a C6-50 aralkyl group, a C6-50 alkylaryl group, a C6-50 cycloalkyl group, and a C3-20 alkylene oxide repeat units.

The part for adjusting length means a part that determines the total length of the polymer and thus influences the molecular weight, and it may exhibit a relatively hydrophobic property.

The part for adjusting length may be physically adsorbed to the aerogel, rendering the surface of surface treated aerogel hydrophilic, thus reinforcing dispersion of the aerogel, and improving compatibility with the water soluble binder.

The C1-50 linear or branched alkyl group, C1-50 acyl group, C6-50 aryl group, C6-50 aralkyl group, C6-50 alkylaryl group, C6-50 cycloalkyl group, and C3-20 alkylene oxide repeat units used as the part for adjusting length may be independently substituted or unsubstituted, wherein the term "unsubstituted" means that a hydrogen atom is bonded to the end, and the term "substituted" means that a hydrogen atom bonded to the end is substituted with another atom or atomic group.

Examples of the another atom or atomic group are not specifically limited, and for example, may include carbon, nitrogen, oxygen, silicon, phosphorous, sulfur, halogen atoms, or atomic groups comprising the same, such as a hydroxyl group (—OH), or an amine group (—NH$_2$) and the like.

Specifically, the C1-50 linear or branched alkyl group may include a C1-50 linear alkyl group or a C4-50 branched alkyl group.

The C1-50 acyl group may comprise a C6-50 aryl group or a C1-50 linear or branched alkyl group and a carbonyl group, wherein the carbonyl group means a functional group containing a double bond between a carbon atom and an oxygen atom.

The C1-50 linear or branched alkyl group may include a C1-50 linear alkyl group or a C4-50 branched alkyl group.

The aryl group in the C6-50 aryl group refers to an atomic group formed by removing one hydrogen atom in an aromatic compound, and the examples may include a phenyl group (C$_6$H$_5$—) and the like, without specific limitations.

The C6-50 aryl group or C1-50 linear or branched alkyl group in the C1-50 acyl group may be independently substituted or unsubstituted, wherein the term "unsubstituted" means that a hydrogen atom is bonded to the end, and the term "substituted" means that a hydrogen atom bonded to the end is substituted with another atom or atomic group.

Examples of the another atom or atomic group are not specifically limited, and for example, may include carbon, nitrogen, oxygen, silicon, phosphorous, sulfur, halogen atoms, or atomic groups comprising the same, such as a hydroxyl group (—OH), or an amine group (—NH$_2$) and the like.

Specific examples of the C1-50 acyl group may include a functional group represented by the following Chemical Formula 2.

[Chemical Formula 2]

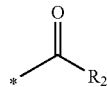

In the Chemical Formula 2, $R_2$ is a C1-50, or C1-40 linear or branched alkyl group; or a C6-50 aryl group; and "*" denotes a direct bond.

The C1-50 ester group refers to an atomic group containing a C6-50 aryl group or a C1-50 linear or branched alkyl group and an ester (—COO—) functional group, wherein the C6-50 aryl group or C1-50 linear or branched alkyl group is as explained above.

The aryl group in the C6-50 aryl group refers to an atomic group formed by removing one hydrogen atom in an aromatic compound, and examples thereof may include a phenyl group (C$_6$H$_5$—), and the like, without specific limitations.

The C6-50 aralkyl group refers to an atomic group formed by substituting a hydrogen atom included in a C1-20 linear or branched alkyl group with the aryl group, and examples thereof may include a benzyl group (C$_6$H$_5$CH$_2$—) and the like, without specific limitations.

The C6-50 alkylaryl group refers to an atomic group formed by substituting a hydrogen atom included in the aryl group with a C1-20 linear or branched alkyl group.

The C6-50 cycloalkyl group refers to an atomic group formed by removing one hydrogen atom in an aliphatic cyclic compound, wherein the cycloalkyl group may be unsubstituted or substituted with a C1-50 linear or branched alkyl group.

The C6-50 heterocycloalkyl group refers to an atomic group formed by removing one hydrogen atom in a heterocyclic compound, wherein the heterocycloalkyl group may be unsubstituted or substituted with a C1-50 linear or branched alkyl group.

The C3-20 alkylene oxide repeat unit may include a repeat unit represented by the following Chemical Formula 3.

[Chemical Formula 3]

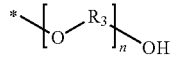

In the Chemical Formula 3, $R_3$ is a C3-20 linear or branched alkylene group, and n is an integer of 1 or more. Preferable examples of the C3-20 linear or branched alkylene group may include a C3-10 alkylene group, and for example, a propylene group or a butylene group. The "*" denotes a direct bond.

The part for adjusting length containing the C3-20 alkylene oxide repeat unit may have a weight average molecular weight of 2000 to 4000.

The part for adjusting length containing the C3-20 alkylene oxide repeat unit may be formed by polymerization of a C3-20 alkylene oxide repeat unit.

More specifically, the part for adjusting length containing the C3-20 alkylene oxide repeat unit may refers to a block consisting of a C3-20 alkylene oxide repeat unit included in a block copolymer formed by block copolymerization of the C3-20 alkylene oxide repeat unit and C1-5 alkylene oxide repeat unit.

The C1-5 alkylene oxide repeat unit and the part for adjusting length included in the polymer may form a direct bond or be copolymerized. Specifically, the C1-50 linear or branched alkyl group, C1-50 acyl group, C6-50 aryl group, C6-50 aralkyl group, C6-50 alkylaryl group and C6-50 cycloalkyl group may directly bond with the C1-5 alkylene oxide repeat unit to form a polymer.

Specific examples may include BRIJ (Aldrich Company) using a C1-50 linear or branched alkyl group, TWEEN using a C1-50 acyl group, and TRITON using a C6-50 alkylaryl group as the part for adjusting length, and the like.

And, the C3-20 alkylene oxide repeat unit may be copolymerized with the C1-5 alkylene oxide repeat unit to form a polymer.

More specifically, the polymer may include polyolefin oxide-based block copolymer comprising the C3-20 alkylene oxide repeat unit and the C1-5 alkylene oxide repeat unit. Examples of the polyolefin oxide-based repeat unit may include a polyethylene oxide repeat unit or a polypropylene oxide repeat unit.

More specifically, examples of the polyolefin oxide-based block copolymer may include Pluronic (manufactured by BASF Company) using polyethyleneoxide-polypropyleneoxide or polyethyleneoxide-polypropyleneoxide-polyethyleneoxide, and the like.

The polymer may be included in the content of 0.05 wt % to 0.7 wt % based on the total thermal insulation coating composition. If the content of the polymer is less than 0.05 wt %, compatibility between the water soluble binder and the aerogel may decrease, and thus, cracks may be generated in the finally produced thermal insulation coating layer.

If the content of the polymer is greater than 0.7 wt %, due to excessively increased compatibility between the water soluble binder and the aerogel, the water soluble binder may penetrate into the micropores of the aerogel and decrease porosity inside of the thermal insulation coating composition, and thus, optimum thermal insulation property may not be achieved.

The polymer may have weight average molecular weight of 500 to 30,000 or 1,000 to 10,000, or 3000 to 5000. If the weight average molecular weight of the polymer is less than 500, the part for adjusting length included in the polymer may become short, and hydrophobicity of the polymer may become too low compared to hydrophilicity, and thus, aerogel adsorption properties may decrease and the thermal insulation coating composition may not have a uniform composition, and the water soluble binder may penetrate into the aerogel.

If the weight average molecular weight of the polymer is greater than 30,000, the part for adjusting length included in the polymer may become too long, and hydrophilicity of the polymer may become too low compared to hydrophobicity, and thus, solubility for a solvent exhibiting hydrophilicity may decrease.

Meanwhile, the aerogel may include aerogel dispersed in a low boiling point organic solvent having a boiling point of 100° C. or less or an aqueous solvent.

Specific examples of the low boiling point organic solvent may include methylalcohol, ethylalcohol, propylalcohol, n-butylalcohol, iso-butylalcohol, tert-butylalcohol, acetone, methylenechloride, ethylene acetate, isopropylalcohol or a mixture thereof.

A specific example of the aqueous solvent is water.

Although the solid content of the aerogel in the low boiling point organic solvent or aqueous solvent is not specifically limited, it may be 5 wt % to 75 wt % considering uniformity or physical properties of the thermal insulation coating composition.

As the aerogel, previously known common aerogels may be used, and specifically, aerogels containing silicon oxide, carbon, polyimide, metal carbide or a mixture thereof may be used. The aerogel may be in the form of powder, granule, monolith and the like, and preferably, powder form may be used.

And, the aerogel may have a specific surface area of 100 $cm^3/g$ to 1,000 $cm^3/g$, or 300 $cm^3/g$ to 900 $cm^3/g$.

The specific surface area is a surface area per unit mass of material, and if the specific surface area of the aerogel is less than 100 $cm^3/g$, physical adsorption between the aerogel and the amphiphilic compound containing a hydrophilic functional group and a hydrophobic aliphatic chain may be decreased, and if the specific surface area of the aerogel is greater than 1,000 $cm^3/g$, the water soluble binder may penetrate into the internal pores of the aerogel during the process of mixing the aerogel and the water soluble binder, and thus the porosity of the thermal insulation coating composition may decrease, thus decreasing thermal insulation properties.

Meanwhile, the water soluble binder may be dispersed in a low boiling point organic solvent having a boiling point of 100° C. or less or an aqueous solvent.

Specific examples of the low boiling point organic solvent may include methylalcohol, ethylalcohol, propylalcohol, n-butylalcohol, iso-butylalcohol, tert-butylalcohol, acetone, methylenechloride, ethylene acetate, isopropylalcohol or a mixture thereof.

Specific examples of the aqueous solvent may include water.

Although the solid content of the water soluble binder in the low boiling point organic solvent or aqueous solvent is not specifically limited, it may be 5 wt % to 75 wt % considering uniformity or physical properties of the thermal insulation coating composition.

Meanwhile, the water soluble binder refers to a binder with water solubility such that it exhibits high compatibility and may not be precipitated in an aqueous solvent including water.

Although examples of the water soluble binder are not specifically limited, for example, it may include a silicon-based compound or polymer resin.

The silicon-based compound refers to an inorganic binder containing a silicon (Si) atom, and it may include silicate or water soluble silicon.

The silicate refers to a compound formed by bonding of one kind or one or more kinds of metal oxide with silica ($SiO_2$), and specific examples thereof may include metal silicate salt.

Although examples of the metal silicate salt are not specifically limited, for example, compounds containing alkali metal ion, alkali earth metal ion, earth metal ion or transition metal cation, and silicate anion may be used.

Specific examples of the metal silicate salt may include alkali metal orthosilicate, alkali metal metasilicate, alkali metal tetrasilicate, alkali metal disilicate, and the like.

More specifically, potassium metasilicate, sodium orthosilicate, potassium disilicate, lithium orthosilicate, lithium metasilicate, lithium disilicate, rubidium disilicate, rubidium tetrasilicate, guanidine silicate and the like may be used.

The examples of the water soluble silicon, although not specifically limited, may include silicate. Examples of the silicate may include sodium silicate ($Na_2SiO_3$), which is also referred to as water glass.

The polymer resin may include non-ionic polymer resin or ionic polymer resin, wherein the "nonionic" means a property of not being ionized in an aqueous solution, and the "ionic" means a property of being ionized in an aqueous solution.

Examples of the non-ionic polymer resin may include polyethylene oxide, polyvinyl alcohol, polyacrylamide, polyvinylpyrrolidone and the like.

Examples of the ionic polymer resin may include polyacrylic acid, polystyrene sulfonic acid, polysilicic acid, polymaleic acid, polyethyleneimine, polyamine and the like.

The polymer resin may have weight average molecular weight of 3,000 to 300,000, or 5,000 to 200,000.

If the weight average molecular weight of the polymer resin is less than 3,000, it may be difficult to sufficiently achieve mechanical properties, heat resistance or thermal insulation properties of the thermal insulation coating layer obtained from the thermal insulation coating composition, and if the weight average molecular weight of the polymer resin is greater than 300,000, uniformity or homogeneity of the thermal insulation coating layer obtained from the thermal insulation coating composition may be degraded, dispersibility of the aerogel in the thermal insulation coating composition may decrease or a nozzle and the like of a coating apparatus may be blocked when coating the thermal insulation coating composition, and a time for heat treating the thermal insulation coating composition may increase and heat treatment temperature may increase.

Meanwhile, the thermal insulation coating composition may further comprise an aqueous solvent or an organic solvent. Specifically, the aqueous solvent or organic solvent may be included in the content of 50 to 95 wt %, or 75 to 90 wt % in the thermal insulation coating composition. Specific examples of the aqueous solvent or organic solvent are not specifically limited, and commonly used solvents may be used.

Although a preparation method of the thermal insulation coating composition of the one embodiment is not specifically limited, for example, a method comprising the steps of adsorbing a part for adjusting length included in the polymer onto the surface of the aerogel dispersed in the above explained low boiling point organic solvent or aqueous solvent, and then, adding a water soluble binder to the low boiling point organic solvent or aqueous solvent, to uniformly mix the water soluble binder and the aerogel may be used.

The method of mixing is not specifically limited, and commonly known physical mixing methods may be used.

For example, a method comprising the steps of mixing the two or more kinds of solvent dispersed phases, adding zirconia beads thereto, and ball milling at a speed of 100 to 500 rpm under room temperatures and atmospheric pressure conditions, to prepare the thermal insulation coating composition (coating solution) may be used.

However, a method of mixing each solvent dispersed phase of the water soluble binder and the aerogel is not limited to the above explained example.

Meanwhile, according to another embodiment of the disclosure, provided is a thermal insulation coating layer comprising a water soluble binder, and polymer comprising a C1-5 alkylene oxide repeat unit and a part for adjusting length and aerogel dispersed in the water soluble binder, wherein the thermal insulation coating layer has a thermal conductivity of 0.40 W/m K or less.

The inventors prepared a thermal insulation coating layer that has low thermal conductivity and low density and yet may achieve excellent mechanical properties and heat resistance, and when applied to an internal combustion engine, may reduce thermal energy released outside, and thus, may improve internal combustion efficiency and automobile fuel efficiency, by using the thermal insulation coating composition of the one embodiment.

The thermal insulation coating layer obtained from the thermal insulation coating composition of the one embodiment may achieve similar or better properties of the aerogel, and the aerogel may be more uniformly dispersed in the water soluble binder, thus realizing improved thermal insulation properties together with excellent mechanical properties and heat resistance.

Specifically, the part for adjusting length included in the polymer exhibits hydrophobicity and thus may be adsorbed onto the surface of aerogel, and the outer surface of the aerogel may be modified with a hydrophilic C1-5 alkylene oxide repeat unit.

Thereby, compatibility between the aerogel and the water soluble binder increases, thus exhibiting a uniform composition over the whole area of the thermal insulation coating composition, and the binder may be prevented from being penetrated into the nanopores of the aerogel, thereby realizing high thermal insulation properties through low thermal conductivity and volumetric heat capacity.

As explained above, since the thermal insulation coating layer obtained from the thermal insulation coating composition of the one embodiment may maintain the properties and the structure of the aerogel to a similar or more excellent degree, it may achieve excellent mechanical properties and heat resistance while having lower thermal conductivity and low density, and when applied to an internal combustion engine, may reduce thermal energy released outside, thus improving internal combustion engine efficiency and automobile fuel efficiency.

The thermal insulation coating layer may have a thermal conductivity of 0.40 W/m K or less.

The thermal conductivity means a degree of exhibiting capability of transferring heat by conduction, and if the thermal conductivity of the thermal insulation coating layer is greater than 0.40 W/m K, the amount of thermal energy released outside of the thermal insulation coating layer may increase and thus reflect a decrease of thermal insulation properties, and thus, energy efficiency may decrease.

The thermal insulation coating layer may have a density of 0.45 to 1.0 g/ml.

If the density of the thermal insulation coating layer is less than 0.45 g/ml, cracks may be generated inside of the thermal insulation coating layer, thus decreasing mechanical properties and appearance properties, and if the density of the thermal insulation coating layer is greater than 1.0 g/ml, the water soluble binder may penetrate into the nanopores inside of the aerogel to decrease porosity of the inside of the thermal insulation coating layer, and thus, thermal conductivity may increase and thermal insulation properties may decrease.

And, the thermal insulation coating layer may have a volumetric heat capacity of 3000 kJ/m³ K or less.

The volumetric heat capacity means a quantity of heat required to raise the temperature of material of unit volume by 1° C., and specifically, it may be calculated by the following Equation 1.

$$\text{Volumetric heat capacity kJ/m}^3\text{K} = \text{specific heat (KJ/g·K)} \times \text{density (g/m}^3\text{)} \qquad [\text{Equation 1}]$$

Since the specific is a unique property of material and represents a constant value, the volumetric heat capacity is influenced by density. Namely, as the density of the porous polymer resin layer decreases, volumetric heat capacity decreases.

As explained above, if the density of the porous polymer resin layer decreases, thermal conductivity may decrease and thus thermal efficiency increase, and the same effect may be obtained when volumetric heat capacity decreases.

Thus, if the volumetric heat capacity is greater than 3000 kJ/m³ K, the volumetric heat capacity cannot be sufficiently lowered, and thus, the density of the porous polymer resin layer may increase, and thermal conductivity may increase.

Meanwhile, as explained above, since the thermal insulation coating composition of the one embodiment comprises polymer comprising a C1-5 alkylene oxide repeat unit and a part for adjusting length; aerogel; and a water soluble binder, and may minimize direct contact between the water soluble binder and the aerogel before the coating composition is coated and dried, the water soluble binder may not penetrate or impregnate inside the aerogel included in the finally prepared thermal insulation coating layer or pores thereof.

More specifically, the water soluble binder may not substantially exist inside the aerogel dispersed in the water soluble binder, and for example, the water soluble binder may exist inside the aerogel in the content of 2 wt % or less, or 1 wt % or less.

In the thermal insulation coating layer, the aerogel may be dispersed in the water soluble binder, and in this case, although the outside of the aerogel may contact or bond to the water soluble binder, the water soluble binder may not exist inside the aerogel.

Specifically, the water soluble binder may not substantially exist at a depth of 5% or more of the longest diameter from the surface of the aerogel included in the thermal insulation coating layer.

Since the water soluble binder does not penetrate or impregnate into the internal pores of the aerogel, the aerogel may have similar porosities before and after being dispersed in the water soluble binder, and specifically, each aerogel included in the thermal insulation coating layer may have a porosity of 92% to 99% while being dispersed in the water soluble binder.

Thereby, the thermal insulation coating layer may have low thermal conductivity and volumetric heat capacity, thus realizing high thermal insulation properties.

The thermal insulation coating layer of the embodiment may provide a thermal insulation material or thermal insulation structure that can be maintained for a long time inside an internal combustion engine to which high temperature and high pressure conditions are repeatedly applied, and specifically, the thermal insulation coating layer of the embodiment may be formed on an inner side of an internal combustion engine or a component of an internal combustion engine.

The thickness of the thermal insulation coating layer of the embodiment may be determined according to the applied field or location or required properties, and for example, it may be 50 μm to 500 μm.

As explained above, since the thermal conductivity and the volumetric heat capacity of the thermal insulation coating layer correspond to the physical properties of unit volume, thickness changes may influence the physical properties.

If the thickness of the thermal insulation coating layer is less than 50 μm, the density of the thermal insulation coating layer may not be sufficiently lowered, rendering it difficult to lower thermal conductivity below an optimum level, and internal corrosion prevention and surface protection functions may be lowered.

To the contrary, if the thickness of the thermal insulation coating layer is greater than 500 μm, during a curing process of the thermal insulation coating layer of the one embodiment, curing speed may become slow and thus cracks may be generated on the thermal coating layer.

The details of the water soluble binder, the aerogel, and the polymer comprising a C1-5 alkylene oxide repeat unit and a part for adjusting length include the above explained contents with regard to the thermal insulation coating composition of the one embodiment.

Meanwhile, the thermal insulation coating layer of the embodiment may be obtained by drying the thermal insulation coating composition of the one embodiment.

The apparatus or method that can be used for drying the thermal insulation coating layer of the one embodiment is not specifically limited, and a method of natural drying at a temperature above room temperature, or a method of heating to a temperature above 50° C. to dry may be used.

For example, the thermal insulation coating layer may be formed by coating the thermal insulation coating composition of the one embodiment on the inner side of an internal combustion engine or on the outer surface of the component of an internal combustion engine, progressing semidrying at a temperature of 50° C. to 200° C. one or more times, and completely drying the semi-dried coating composition at a temperature of 200° C. or more.

However, a specific preparation method of the thermal insulation coating layer of the embodiment is not limited thereto.

According to the present disclosure, provided are a thermal insulation coating composition that has low thermal conductivity and low volumetric heat capacity and yet may achieve excellent mechanical properties and heat resistance, have a uniform composition over the whole area, and when applied to an internal combustion engine, may reduce thermal energy emitted outside to improve internal combustion engine efficiency and automobile fuel efficiency, and a thermal insulation coating layer prepared using the thermal insulation coating composition.

Hereinafter, the disclosure will be explained in detail with reference to the following Examples. However, these examples are only to illustrate the disclosure, and the scope of the disclosure is not limited thereto.

Examples 1 to 3: Preparation of a Thermal Insulation Coating Composition and a Thermal Insulation Coating Layer (1) Preparation of a Thermal Insulation Coating Composition Porous silica aerogel dispersed in ethyl alcohol (specific surface area about 500 cm³/g), Pluonic 10200 (manufactured by BASF Company) as surfactant and water were mixed, and the mixture was introduced into a 20 g reactor together with silicate dispersed in water. And, zirconia beads were added thereto (440 g), followed by ball milling at a speed of 150 to 300 rpm under room temperature and atmospheric pressure conditions, to prepare a thermal insulation coating composition (coating solution).

(2) Formation of a Thermal Insulation Coating Layer

The obtained thermal insulation coating composition was coated on a piston for an automobile engine by spray coating.

And, primary semidrying was progressed at about 150° C. for about 10 minutes, and then, the thermal insulation coating composition was recoated, and secondary semidrying was progressed at about 150° C. for about 10 minutes.

After the secondary semidrying, the thermal insulation coating composition was recoated, and complete drying was progressed at about 250° C. for about 60 minutes to form a thermal insulation coating layer on the piston.

Comparative Example 1: Preparation of a Thermal Insulation Coating Composition and a Thermal Insulation Coating Layer As shown in the following Table 1, a thermal insulation coating composition and a thermal insulation coating layer were prepared by the same method as Example 1, except that sodium lauryl sulfate (SDS) was used as a surfactant instead of Pluronic 10200.

TABLE 1

Compositions of the thermal insulation coating compositions of Examples and Comparative Example

| | Aerogel (wt %) | surfactant (wt %) | Water (wt %) | Water soluble binder (wt %) |
|---|---|---|---|---|
| Example 1 | 10 | Pluonic 10200(0.1) | 79.9 | 10 |
| Example 2 | 10 | Pluonic 10200(0.3) | 79.7 | 10 |
| Example 3 | 10 | Pluonic 10200(0.5) | 79.5 | 10 |
| Comparative Example 1 | 10 | Sodium lauryl sulfate (SDS) (0.1) | 79.9 | 10 |

Experimental Example: Measurement of the Properties of the Thermal Insulation Coating Layers Obtained in Examples and Comparative Example The properties of the thermal insulation coating layers obtained in Examples and Comparative Examples were measured as follows, and the results are shown in the following Table 2.

Experimental Example 1: Measurement of Thermal Conductivity

For the thermal insulation coating layers on a piston obtained in Examples and Comparative Example, thermal conductivity was measured by a thermal diffusivity measuring method using a laser flash method under room temperature and atmospheric pressure conditions according to ASTM E1461.

Experimental Example 2: Measurement of Density

For the thermal insulation coating layers obtained in Examples and Comparative Example, density was measured by a degree of alcohol and water being absorbed into the coating layer and influencing on the buoyancy through a density balance (Sartorius, YKD).

Experimental Example 3: Measurement of Volumetric Heat Capacity

For the thermal insulation coating layers on a piston obtained in Examples and Comparative Example, volumetric heat capacity was confirmed by measuring specific heat with sapphire as a reference using a DSC apparatus under room temperature condition according to ASTM E1269.

Experimental Example 4: Measurement of Compatibility

For the thermal insulation coating layers obtained in Examples and Comparative Example, appearance was confirmed to confirm whether or not cracks exist.

The results of the Experimental Examples of the Examples and Comparative Examples are shown in the following Table 2.

TABLE 2

Measurement results of Experimental Examples and Comparative Examples

| | Thermal conductivity (W/Mk) | Density (g/ml) | Volumetric heat capacity (kJ/m³ K) | Thickness (μm) | Compatibility (crack yes/no) |
|---|---|---|---|---|---|
| Example 1 | 0.35 | 0.5 | 2814 | 213 | No |
| Example 2 | 0.08 | 0.78 | 1324 | 245 | No |
| Example 3 | 0.06 | 0.8 | 924 | 184 | No |
| Comparative Example 1 | 0.37 | 0.4 | 1562 | 195 | Yes |

As shown in the Table 2, the thermal insulation coating layers obtained in Examples 1 to 3 had an unexpectedly low thermal conductivity of 0.4 W/m K or less, thus exhibiting excellent thermal insulation capacity, and exhibited density of 0.45 to 1.0 g/ml, and thus, it was confirmed that compatibility between the aerogel and the water soluble binder is improved and penetration of the water soluble binder into the nanopores of the aerogel is inhibited to maximize thermal insulation properties.

It was also confirmed that by using a non-ionic surfactant, cracks do not exist in the thermal insulation coating layer, thus improving compatibility between the aerogel and the water soluble binder. The absence of cracks in the Examples was unexpected.

To the contrary, it was confirmed that as the thermal insulation coating layer obtained in Comparative Example 1 uses an ionic surfactant, cracks exist and compatibility is not sufficient.

What is claimed is:

1. A thermal insulation coating composition comprising:
   a polymer comprising a C1-5 alkylene oxide repeat unit;
   an aerogel composition; and
   a water soluble binder,
   wherein the aerogel composition includes an aerogel dispersed in a low boiling point organic solvent having a boiling point of 100° C. or less,
   wherein the water soluble binder is dispersed in an aqueous solvent, wherein the polymer is included in the content of 0.05 wt % to 0.7 wt % based on the total thermal insulation composition, wherein the water soluble binder exists in a content of 2 wt % or less inside the aerogel composition, and wherein the water soluble binder does not exist at a depth of 5% or more of the longest diameter from a surface of the aerogel composition.

2. The thermal insulation coating composition according to claim 1, wherein the polymer comprises the C1-5 alkylene oxide repeat unit in a content of 2 wt % to 50 wt % based on the total weight of the polymer.

3. The thermal insulation coating composition according to claim 1, wherein the C1-5 alkylene oxide repeat unit includes a repeat unit represented by the following Chemical Formula 1:

[Chemical Formula 1]

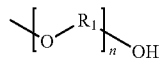

wherein in the Chemical Formula 1, $R_1$ is a C1-5 linear or branched alkylene group, and n is an integer of 1 or more.

4. The thermal insulation coating composition according to claim 1, wherein the polymer has weight average molecular weight of 500 to 30,000.

5. The thermal insulation coating composition according to claim 1, wherein the polymer further comprises at least one part for adjusting length selected from the group consisting of a C1-50 linear or branched alkyl group, a C1-50 acyl group, a C1-50 ester group, a C6-50 aryl group, a C6-50 aralkyl group, a C6-50 alkylaryl group, a C6-50 cycloalkyl group, and a C3-20 alkylene oxide repeat unit.

6. The thermal insulation coating composition according to claim 5, wherein the part for adjusting length comprising a C3-20 alkylene oxide repeat unit has weight average molecular weight of 2000 to 4000.

7. The thermal insulation coating composition according to claim 1, wherein a solid content of the aerogel in the low boiling point organic solvent is 5 wt % to 75 wt %.

8. The thermal insulation coating composition according to claim 1, wherein the water soluble binder includes a silicon-based compound or polymer resin.

9. The thermal insulation coating composition according to claim 1, wherein the solid content of the water soluble binder in the aqueous solvent is 5 wt % to 75 wt %.

10. The thermal insulation coating composition according to claim 1, wherein the thermal insulation coating is used for coating an inner side of an internal combustion engine or a component of the internal combustion engine.

11. A thermal insulation coating layer obtained from the thermal insulation coating composition of claim 1, wherein the aerogel is dispersed in the water soluble binder, and wherein the thermal insulation coating layer has a thermal conductivity of 0.40 W/m K or less.

12. The thermal insulation coating layer according to claim 11, wherein the thermal insulation coating layer has a density of 0.45 to 1.0 g/ml.

13. The thermal insulation coating layer according to claim 11, wherein the thermal insulation coating layer has a thickness of 50 μm to 500 μm.

14. The thermal insulation coating layer according to claim 11, wherein the thermal insulation coating layer has a volumetric heat capacity of 3000 kJ/m$^3$ K or less.

15. The thermal insulation coating layer according to claim 11, wherein the thermal insulation coating layer is formed on an inner side of an internal combustion engine or a component of the internal combustion engine.

* * * * *